(12) United States Patent
Bollmeyer et al.

(10) Patent No.: US 8,793,417 B2
(45) Date of Patent: Jul. 29, 2014

(54) INTEGRATION OF FIELD DEVICES IN A DISTRIBUTED SYSTEM

(75) Inventors: Stefan Bollmeyer, Minden (DE); Armin Dittel, Minden (DE); Dirk Wagener, Stadthagen (DE)

(73) Assignee: ABB AG, Mannheim (DE)

( * ) Notice: Subject to any disclaimer, the term of this patent is extended or adjusted under 35 U.S.C. 154(b) by 244 days.

(21) Appl. No.: 13/332,839

(22) Filed: Dec. 21, 2011

(65) Prior Publication Data

US 2012/0159022 A1   Jun. 21, 2012

(30) Foreign Application Priority Data

Dec. 21, 2010   (DE) .......................... 10 2010 055 337

(51) Int. Cl.
   *G06F 13/00*   (2006.01)
(52) U.S. Cl.
   USPC ............................................. 710/104; 710/9
(58) Field of Classification Search
   USPC ...................... 710/8, 9, 104; 700/9
   See application file for complete search history.

(56) References Cited

U.S. PATENT DOCUMENTS

| | | | | |
|---|---|---|---|---|
| 5,971,581 A | * | 10/1999 | Gretta et al. ................... | 700/83 |
| 6,216,172 B1 | | 4/2001 | Kolblin et al. | |
| 6,850,992 B2 | * | 2/2005 | Heinrich et al. ................ | 710/3 |
| 6,947,389 B1 | * | 9/2005 | Chen et al. .................... | 370/252 |
| 7,558,821 B2 | * | 7/2009 | Schaetzle ...................... | 709/203 |
| 7,593,784 B2 | * | 9/2009 | Carle et al. .................... | 700/175 |
| 2006/0056313 A1 | | 3/2006 | Rietschel | |

FOREIGN PATENT DOCUMENTS

| | | |
|---|---|---|
| DE | 19713240 A1 | 10/1998 |
| DE | 102009045717 A1 | 5/2010 |
| EP | 1209878 A2 | 5/2002 |
| EP | 2090947 A1 | 8/2009 |
| WO | WO 2004/017609 A2 | 2/2004 |

OTHER PUBLICATIONS

German Search Report issued on Aug. 5, 2011, German Application No. 10 2010 055 337.9.

* cited by examiner

*Primary Examiner* — Glenn A Auve
(74) *Attorney, Agent, or Firm* — Buchanan Ingersoll & Rooney P.C.

(57) ABSTRACT

Exemplary embodiments are directed to a system and method for integrating field devices in an automation system having a plurality of field devices connectable via at least one bus system. A respective field device is connected to the bus system of the automation system, and is automatically addressed by a superordinate controller using a predefined default address. The device addressed using the default address then registers in the system with its device address, and a fixed address which is provided from a multiplicity of unassigned addresses from an address memory is automatically allocated to the device registered in the system. An individually assigned identification (TAG) provided from the predetermined configuration of the automation system is allocated to the allocated fixed address, and, after the automatically allocated fixed address has been transmitted to the field device, the field device is changed to a suitable state for communication with the superordinate controller.

19 Claims, 2 Drawing Sheets

INTEGRATION OF FIELD DEVICES IN A DISTRIBUTED SYSTEM

RELATED APPLICATION

This application claims priority under 35 U.S.C. §119 to German Patent Application No. 10 2010 055 337.9 filed in Germany on Dec. 21, 2010, the entire content of which is hereby incorporated by reference in its entirety.

FIELD

The disclosure relates to field devices, such as a method and system for automatically integrating field devices in a distributed automation system.

BACKGROUND INFORMATION

Known automation systems can include a multiplicity of field devices which communicate with one another and/or with superordinate control technology or a controller via a bus system. In this case, exemplary field devices can include drives, valves, motor protection and control devices, frequency converters, pressure and temperature measuring transducers, flowmeters and analysis devices.

Before an automation system is fit for use, the hardware can be modelled as part of a so-called project using a programming tool, also called an engineering tool. Information relating to input/output addresses of these hardware devices and their links to one another are configured in the project, for example.

In this case, the integration of the field devices in the automation system is based on standards, such as OPC, FDT (Field Device Tool), and on the field bus protocols and field bus specifications, for example FOUNDATION field bus or PROFIBUS.

When starting up or expanding a technical installation, field devices should be detected by the superordinate controller after they have been connected to the field bus of the automation system. This detection verifies access by the superordinate controller to the field devices of the automation system which is in the form of a programmable logic control system (PLC) or a process control system, in particular. For this purpose, the field devices are assigned unique bus addresses which can be used to address said field devices. The bus addresses are usually allocated from the superordinate position.

A specific identifier, the device address, which is used by the field device to register on the field bus is reserved for the respective field device for this purpose. The device address is preset in the field devices in the delivery state and can be stored in the memory of the field device but can also be set on the device using coding switches.

If a new field device is now connected to the network of the automation system, the field device initially can be addressed by the system using a so-called default address as part of the address allocation operation.

At present, the device addresses of the field devices should be taken into account when planning a field bus installation and should be matched to the subsequent actual situation in the field. For this purpose, the field device registers with the superordinate controller using the device address, which controller in turn allocates an individual bus address, which replaces the device address, to the device. The amount of planning and documentation needed in this case for the address allocation method is prone to errors and is time-consuming.

However, since the bus address allocated to the respective field device is needed only for protocol-specific communication with the device, for example in order to establish a connection between a controller and the field device or a superordinate control system (PLC) or a process control system and the field device, the bus address is of secondary importance to the user of the automation system since a special identifier or a system-specific name, also referred to as a "generic PD TAG", can be used to identify the respective device inside the automation system.

In the process control system of a technical installation, the TAG comprises, for example, the position name of the respective field device in the system, which name can correspond to the measuring position number from an MCR (measurement/control/regulation) scheme and also comprises, inter alia, the respective function of the device, the manufacturer, the device type and its revision status.

Alternatively, there are tools on the market which detect the field devices, also referred to as bus users, connected to the bus with the aid of field bus communication and create the topology of the system from the data obtained in the process. However, this method works only if the field devices already have a suitable address for more unique identification, such as when the field bus has been started up.

SUMMARY

An exemplary method for automatically integrating field devices in an automation system having a plurality of field devices connectable via at least one bus system is disclosed. The field devices being incorporated in the automation system via the bus system according to a predetermined configuration stored in a software system, in particular in a memory of the automation system and executed by a processor of the automation system, the method comprising: connecting the respective field device to the bus system of the automation system; automatically addressing the respective field device connected to the system by a superordinate controller using a predefined default address by means of an automatically running first routine; registering the default address of the addressed device in the system using its device address; allocating automatically a fixed address selected from a plurality of unassigned addresses in an address memory is automatically allocated to the device registered in the system by means of a second automatically running routine; allocating an individually assigned identification (TAG) provided from the predetermined configuration of the automation system to the allocated fixed address, and after the automatically allocated fixed address has been transmitted to the field device, changing the field device to a suitable state for communication with the superordinate controller.

An automation system is disclosed, comprising: at least one bus system; a plurality of field devices connectable via the at least one bus system; and a superordinate controller configured with program code, wherein the controller includes: means for automatically addressing a respective field device connected to the system using a predefined default address; means for registering the default address of the addressed device in the system using its device address; allocating automatically a fixed address selected from a plurality of unassigned addresses in an address memory is automatically allocated to the device registered in the system; means for allocating an individually assigned identification (TAG) provided from the predetermined configuration of the automation system to the allocated fixed address; and means for changing the field device to a suitable state after the automatically allocated fixed address has been transmitted to the field device.

An exemplary processing apparatus of an automation system having a plurality of field devices connectable via at least one bus system is disclosed. The apparatus comprising: memory for storing a predetermined configuration of the field devices; means for automatically addressing a respective field device connected to the system using a predefined default address; means for registering the default address of the addressed device in the system using its device address; means for allocating automatically a fixed address selected from a plurality of unassigned addresses in an address memory is automatically allocated to the device registered in the system; means for allocating an individually assigned identification (TAG) provided from the predetermined configuration of the automation system to the allocated fixed address; and means for changing the field device to a suitable state for communication with a superordinate controller after the automatically allocated fixed address has been transmitted to the respective field device.

BRIEF DESCRIPTION OF THE DRAWINGS

Exemplary embodiments according to the present disclosure and further advantageous refinements and further advantages are intended to be explained and described in more detail using FIGS. 1 and 2.

DETAILED DESCRIPTION

Accordingly, exemplary embodiments of the present disclosure are directed to a method and system for automatically integrating field devices in an automation system that avoids the abovementioned disadvantages.

In particular, the exemplary embodiments disclosed herein are directed to reducing the amount of planning and documentation needed when integrating the field devices in the distributed system during the address allocation method and for simplifying the start-up of the automation system.

Figure 1:
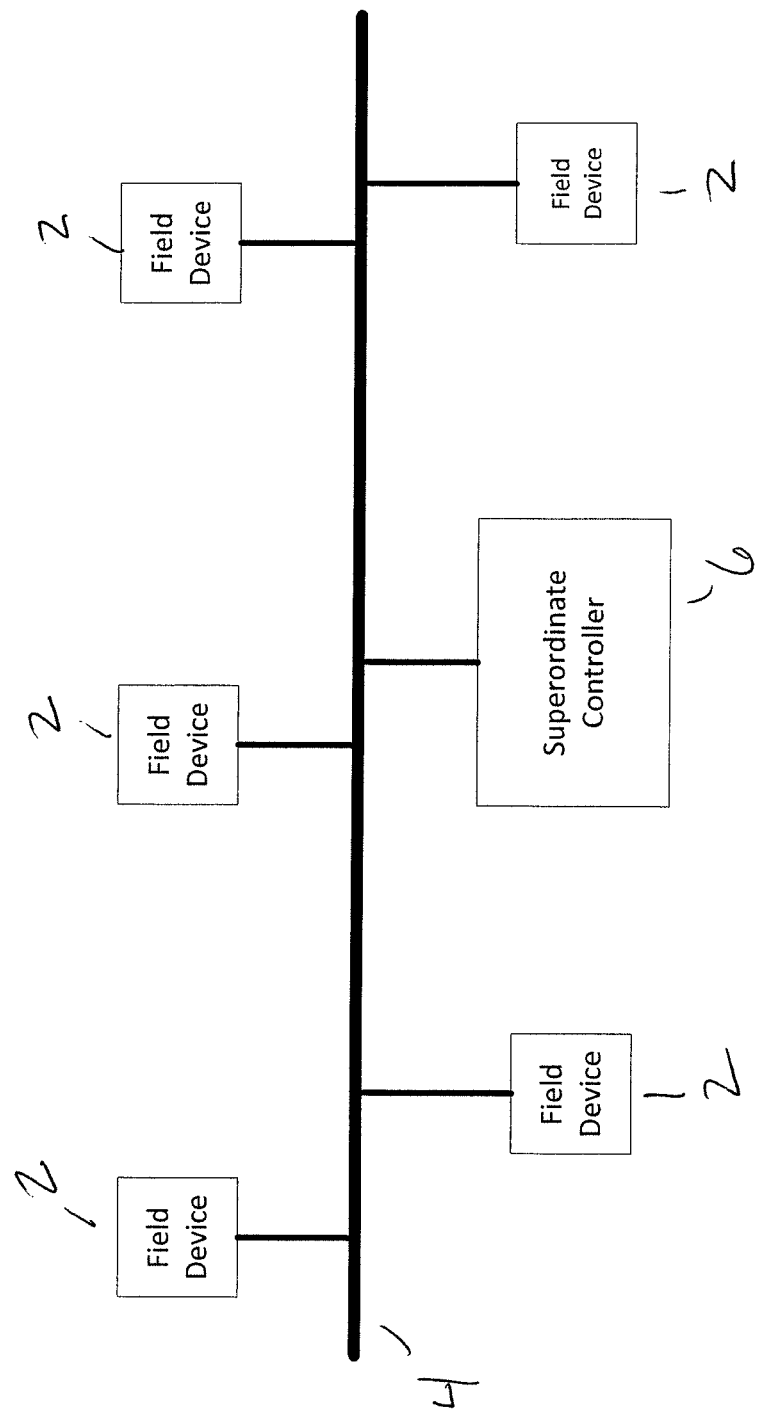
FIG. 1 is a block diagram illustrating an automation system in accordance with an exemplary embodiment.

An exemplary embodiment of the present disclosure is directed to a method for automatically integrating field devices in an automation system 1. FIG. 1 is a block diagram illustrating an automation system in accordance with an exemplary embodiment. The method provides for a plurality of field devices 2 to be connected, via a bus system 4 or a bus connection, for example HART, FOUNDATION FIELDBUS or PROFIBUS, to at least one superordinate controller 6 for controlling and/or monitoring a technical installation or a technical process and for the field devices to be incorporated in the network of the distributed system via the bus system according to a predetermined configuration stored in a software system of the distributed system.

The exemplary method includes the following method steps which are used to replace the device address of the respective field device 2 with the identification (also referred to as TAG) used in the predetermined configuration.

In a first step, the respective field device 2 is connected to the bus system 4 of the automation system 1.

In a second step, the respective field device 2 connected to the system is automatically addressed by the superordinate controller 6 using a predefined default address by means of an automatically running first routine. The default address is an address which is reserved in the system, is preset in the field devices 2 in the delivery state and is identical for all field devices 2. If a new field device is connected to the network of the automation system, the newly connected field device is first addressed using the default address as part of the automatic address allocation operation.

The device addressed using the default address registers in the system using its device address in a next step.

In a further step, a fixed address which is provided from a multiplicity of unassigned addresses from an address memory is automatically allocated to the device which is now registered in the system by means of a second automatically running routine. The newly allocated fixed address makes it possible for the superordinate controller 6 of the distributed system to uniquely address the respective field device 2 via the communication connection. In this case, the automatic address allocation operation is started using a graphical user interface, for example.

In a final step, an individually assigned generic identification (also referred to as TAG) provided from the predetermined configuration of the automation system is allocated to the allocated fixed address and, after the automatically allocated fixed address has been transmitted to the field device, the field device is changed to a suitable state for communication with the superordinate controller. The TAG contains, for example, the following information: installation identification, device address, bus address, measuring position number, process unit, sensor type, maximum sensor range.

The exemplary embodiments of the present disclosure provides for the assigned fixed address to be adopted into the project data relating to the installation of the distributed system, the project data describing the hardware provided in the system.

One advantageous refinement of the method according to the exemplary embodiments disclosed herein provides a test routine which detects a fixed address which has already been automatically allocated to a field device from the address area, the address which has already been allocated being retained by the respective field device 2.

One advantageous development of the exemplary embodiments of the present disclosure provides for the previously automatically allocated fixed address to be changed to a previously unassigned bus address from the address area using a change routine. A special address in the address area can also be reserved for the field device 2 based on of a predefined function in the automation system. For example, according to the FOUNDATION field bus specifications, a backup link master used there is intended to have as low an address as possible because the priority during the changeover operation to be carried out depends on said address.

The configuration steps for allocating the identification (TAG) and/or assigning it to a pre-planned functionality of the device, which can be carried out using the exemplary method according to the present disclosure, can be carried out using a start-up tool. The start-up tool can also be used to check whether an identification (TAG) which has already been stored in the device corresponds to the project data. If so, automatic assignment to the pre-planned functionality is then carried out.

Exemplary embodiments according to the present disclosure can be used in process automation or machine control for controlling processes and/or installation components.

Figure 2:
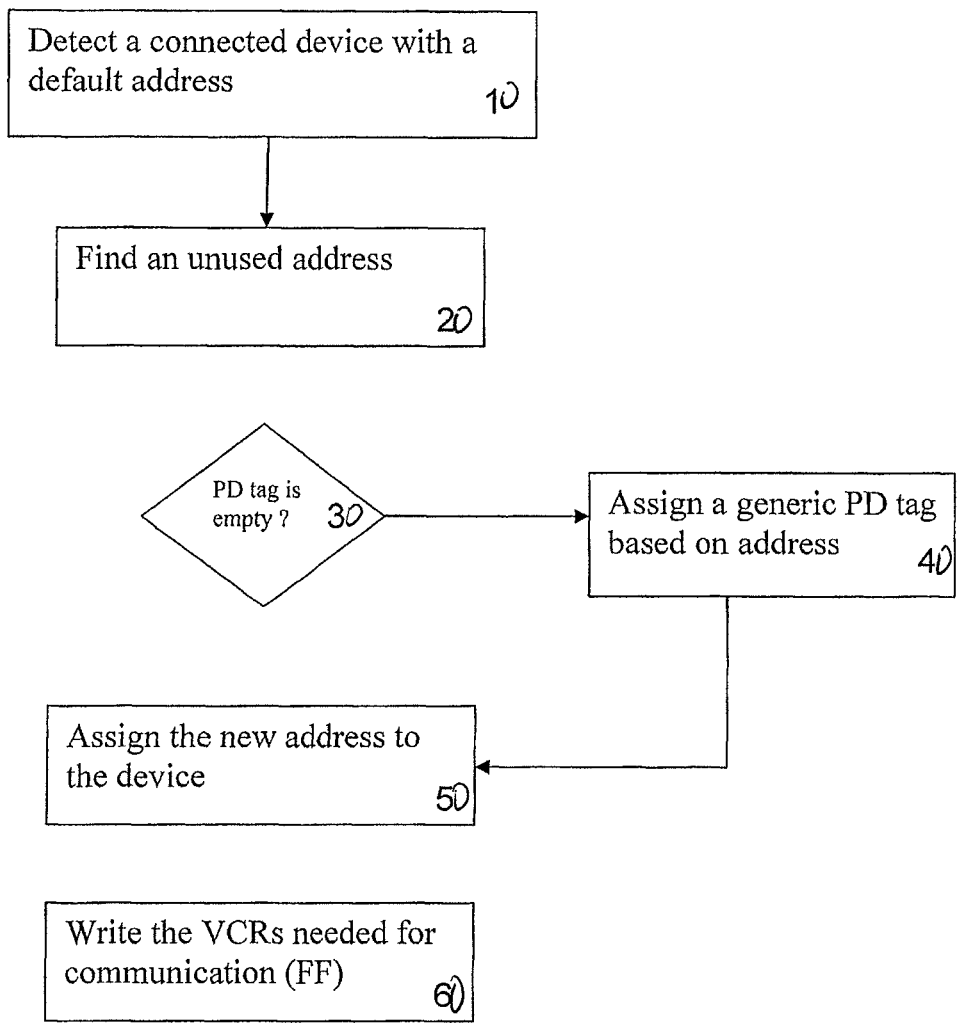
FIG. 2 is a flowchart for replacing the device address of a field device in accordance with an exemplary embodiment.

FIG. 2 is a flowchart for replacing the device address of a field device in accordance with an exemplary embodiment. The field device is newly connected to an automation system with a PD (Physical Device) TAG, which is used in a predetermined configuration of the project for the automation system 1 and comprises, as the physical device identification, the name of a field device 2 according to the FOUNDATION field bus specification.

After the field device 2, which is newly connected to a bus system 4 of the automation system, has been detected using a default address in a first step 10, a free address from an available address or memory area for the project is automatically searched for in a second step 20 for the temporary address of the field device 2. Since the new address found no longer has to be changed by the user for permanent operation of the bus system 4, the free address is also referred to as a fixed address below.

In a step 30, after checking whether a PD TAG has already been stored in the device and if a PD TAG is already present in the device, the TAG already stored in the device is automatically assigned (step 40) to a pre-planned functionality, for example using a start-up tool.

If a PD TAG is not yet present, a corresponding PD TAG is allocated to the automatically allocated fixed address.

After the PD TAG has been assigned to the fixed address, the fixed address is allocated to the device in a further step 50.

In a step 60, predefined communication connections are produced for the network management of the automation system 1 and, after the automatically allocated fixed address has been transmitted to the field device 2, the field device 2 is able to communicate with a superordinate controller 6 of the automation system 1, for example according to the field bus protocols PROFIBUS and/or Foundation field bus.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for automatically integrating field devices in an automation system having a plurality of field devices connectable via at least one bus system, the field devices being incorporated in the automation system via the bus system according to a predetermined configuration stored in memory of the automation system and executed by a processor of the automation system, the method comprising:
   connecting a respective field device to the bus system of the automation system;
   automatically addressing the respective field device connected to the system by a superordinate controller using a predefined default address by means of an automatically running first routine;
   registering the default address of the addressed device in the system using its device address;
   allocating automatically a fixed address selected from a plurality of unassigned addresses in an address memory to the device registered in the system by means of a second automatically running routine;
   allocating an individually assigned identification (TAG) provided from a predetermined configuration of the automation system to the allocated fixed address; and
   after the automatically allocated fixed address has been transmitted to the respective field device, changing the field device to a suitable state for communication with the superordinate controller.

2. The method according to claim 1, comprising:
   adopting the assigned fixed address into project data relating to an the installation of the distributed system, the project data describing a hardware provided in the distributed system.

3. The method according to claim 1, comprising:
   detecting a fixed address which has already been automatically allocated to the respective field device from an address area using a test routine, wherein the address which has already been allocated is retained by the respective field device.

4. The method according to claim 1, comprising:
   changing the previously automatically allocated fixed address to a previously unassigned bus address from an address area using a change routine.

5. The method according to claim 1, wherein a special address in an address area is reserved for the respective field device on the basis of a predefined function in the automation system.

6. The method according to claim 1, wherein the automatic address allocation is started with the aid of a graphical user interface.

7. The method according to claim 1, comprising:
   at least one of allocating the identification (TAG), and assigning the identification to a planned functionality of the respective device via a start-up tool.

8. The method according to claim 7, comprising:
   automatically assigning an identification (TAG) which is already stored in the respective field device and corresponds to project data the planned functionality of the respective field device using the start-up tool.

9. The method according to claim 1, wherein the automation system communicates using at least one of PROFIBUS and Foundation field bus protocols.

10. An automation system, comprising:
    at least one bus system;
    a plurality of field devices connectable via the at least one bus system; and
    a superordinate controller configured with program code, wherein the controller includes:
       means for automatically addressing a respective field device connected to the system using a predefined default address;
       means for registering the default address of the addressed device in the system using its device address;
       means for allocating automatically a fixed address selected from a plurality of unassigned addresses in an address memory is automatically allocated to the device registered in the system;
       means for allocating an individually assigned identification (TAG) provided from a predetermined configuration of the automation system to the allocated fixed address; and
       means for changing the field device to a suitable state after the automatically allocated fixed address has been transmitted to the respective field device.

11. The system according to claim 10, comprising:
    memory for storing the assigned fixed address into project data relating to an installation of the distributed system, wherein the project data describes hardware provided in the system.

12. The system according to claim 10, wherein the controller comprises:
    means for detecting a fixed address which has already been automatically allocated to the respective field device from an address area using a test routine, wherein the address which has already been allocated is retained by the respective field device.

13. The system according to claim 10, wherein the controller comprises:
means for changing the previously automatically allocated fixed address to a previously unassigned bus address from an address area using a change routine.

14. The system according to claim 10, wherein the controller reserves a special address in an address area for the respective field device on the basis of a predefined function in the automation system.

15. The system according to claim 10, comprising:
a graphical user interface for starting automatic address allocation.

16. The system according to claim 10, comprising:
a start-up tool for at least one of allocating the identification (TAG) and assigning it to a planned functionality of the respective field device.

17. The system according to claim 16, wherein the start-up tool automatically assigns an identification (TAG) which is already stored in the respective field device and corresponds to project data of the planned functionality of the respective field device.

18. The system according to claim 10, wherein the automation system communicates using at least one of PROFIBUS and Foundation field bus protocols.

19. A processing apparatus of an automation system having a plurality of field devices connectable via at least one bus system, comprising:
memory for storing a predetermined configuration of the field devices;
means for automatically addressing a respective field device connected to the system using a predefined default address;
means for registering the default address of the addressed device in the system using its device address;
means for allocating automatically a fixed address selected from a plurality of unassigned addresses in an address memory to the device registered in the system;
means for allocating an individually assigned identification (TAG) provided from the predetermined configuration of the automation system to the allocated fixed address; and
means for changing the field device to a suitable state after the automatically allocated fixed address has been transmitted to the respective field device.

* * * * *